United States Patent
Wu et al.

(10) Patent No.: US 8,089,377 B2
(45) Date of Patent: *Jan. 3, 2012

(54) METHOD AND APPARATUS OF PERFORMING SAMPLE RATE CONVERSION OF A MULTI-CHANNEL AUDIO SIGNAL

(75) Inventors: David Chaohua Wu, San Diego, CA (US); Sheng Zhong, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 1183 days.

This patent is subject to a terminal disclaimer.

(21) Appl. No.: 11/835,189

(22) Filed: Aug. 7, 2007

(65) Prior Publication Data

US 2007/0273563 A1 Nov. 29, 2007

Related U.S. Application Data

(63) Continuation of application No. 10/082,950, filed on Feb. 26, 2002, now Pat. No. 7,253,753.

(51) Int. Cl.
 *H03M 7/00* (2006.01)
(52) U.S. Cl. .......................... 341/61; 348/485
(58) Field of Classification Search ............ 341/55–110; 348/485, E5.123, E5.125; 381/2
See application file for complete search history.

(56) References Cited

U.S. PATENT DOCUMENTS

| | | | |
|---|---|---|---|
| 5,559,513 A | 9/1996 | Rothermel et al. | |
| 5,903,482 A | 5/1999 | Iwamura et al. | |
| 5,907,295 A | 5/1999 | Lin | |
| 6,208,671 B1 | 3/2001 | Paulos et al. | |
| 6,584,145 B1 | 6/2003 | Camagna et al. | |
| 6,747,581 B2 | 6/2004 | Hodges | |
| 7,253,753 B2 * | 8/2007 | Wu et al. | ......................... 341/61 |
| 2002/0140853 A1 | 10/2002 | Yang et al. | |

FOREIGN PATENT DOCUMENTS

| | | |
|---|---|---|
| WO | 00/65713 A2 | 11/2000 |
| WO | 01/99277 A1 | 12/2001 |

OTHER PUBLICATIONS

European Search Report for EP Application No. 03 00 4148.

* cited by examiner

*Primary Examiner* — Lam T Mai
(74) *Attorney, Agent, or Firm* — McAndrews, Held & Malloy, Ltd.

(57) ABSTRACT

A method and apparatus are disclosed for performing sampling rate conversion of an audio signal from a first sampling rate to any of a plurality of higher sampling rates using a single set of low-pass filter coefficients. Sampling rate conversion is accomplished by effectively up-sampling, low-pass filtering, and down-sampling the audio signal to generate interpolated output samples of a second digital audio signal at any of a plurality of sampling rates. The sampling rate conversion process includes storing a fixed set of filter coefficients as a plurality of phased subsets of filter coefficients, applying samples of the audio signal to the phased subsets in a rotational manner to generate filtered samples of the audio signal, and selecting and linear interpolating between certain filtered samples to generate samples of the second digital audio signal.

20 Claims, 6 Drawing Sheets

Sample Rate Conversion (SRC)

Sample Rate Conversion (SRC)

METHOD AND APPARATUS OF PERFORMING SAMPLE RATE CONVERSION OF A MULTI-CHANNEL AUDIO SIGNAL

RELATED APPLICATIONS

This application is a continuation of U.S. patent application Ser. No. 10/082,950 filed Feb. 26, 2002, which references the following applications: U.S. patent application Ser. No. 10/083,052 filed Feb. 26, 2002 (now U.S. Pat. No. 7,079,657; U.S. patent application Ser. No. 10/083,076 filed Feb. 26, 2002 (now U.S. Pat. No. 7,006,806; U.S. patent application Ser. No. 10/083,203 filed Feb. 26, 2002 (now U.S. Pat. No. 6,859,238; and U.S. patent application Ser. No. 10/083,201 filed Feb. 26, 2002 (now U.S. Pat. No. 6,832,078).

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Certain embodiments of the present invention relate to the processing of multi-channel television signals. More specifically, certain embodiments relate to a method and apparatus for performing sampling rate conversion on digitally decoded BTSC (Broadcast Television System Committee) audio signals.

During the 1980's, the FCC adopted the BTSC format as a standard for multi-channel television sound (MTS). Typically, the BTSC format is used with a composite TV signal that includes a video signal as well as the BTSC format for the sound reproduction.

The BTSC format is similar to FM stereo but has the ability to carry two additional audio channels. Left plus right (L+R) channel mono information is transmitted in a way similar to stereo FM in order to ensure compatibility with monaural television receivers. A 15.734 KHz pilot signal is used, instead of the FM stereo 19 KHz pilot signal, which allows the pilot signal to be phase-locked to the horizontal line frequency. A double sideband-suppressed carrier at twice the frequency of the pilot transmits the left minus right (L−R) stereo information. The stereo information is DBX encoded to aid in noise reduction. An SAP channel is located at 5 times the pilot frequency. The SAP channel may be used for second language or independent source program material. A professional audio channel may be added at 6.5 times the pilot frequency in order to accommodate additional voice or data.

Stereo tuners and demodulator units capable of decoding the BTSC format have been on the market for some time. The front end of the units typically includes analog components or integrated circuit chips. Traditionally, BTSC decoding has been done in the analog domain requiring larger, more expensive implementations that consume a significant amount of power. Previous digital implementations may not be optimized, requiring many clock cycles to perform various processing functions.

It is desirable to perform BTSC decoding in the digital domain on a block of an ASIC chip such that the implementation is optimized for reduced complexity and cost. By reducing the complexity, fewer clock cycles are required for processing, and power consumption is also reduced.

There are several digital audio output sampling rates that are standard in the industry. The standard digital audio output sampling rates include 32 KHz, 44.1 KHz, and 48 KHz. After decoding any signal component of a composite audio signal down to a common, single sampling rate, it is desirable to be able to output the signal component at any of the three sampling rates described above.

Traditionally, a design to convert from a single sampling rate to any of multiple sampling rates would require multiple sampling rate conversion schemes, one to handle each desired standard output sampling rate. As a result, duplication of hardware and additional cost and power consumption would be incurred. An efficient implementation to convert from a single sampling rate to any of the standard sampling rates is desired.

Further limitations and disadvantages of conventional and traditional approaches will become apparent to one of skill in the art, through comparison of such systems with embodiments of the present invention as set forth in the remainder of the present application with reference to the drawings.

A need exists for an approach to perform efficient sampling rate conversion in a multi-channel audio signal decoding system by reducing the complexity of the hardware required, therefore reducing cost and power consumption.

BRIEF SUMMARY OF THE INVENTION

An embodiment of the present invention provides efficient, low cost sampling rate conversion of a non-standard digital audio signal in a digital multi-channel audio system. Using a single set of low pass filter coefficients, sampling rate conversion from a non-standard digital audio rate to any of a plurality of standard digital audio rates is accomplished. In such an environment, several stages of digital processing are performed. Efficient processing methods are used to execute the various processing functions in order to reduce clock cycles and addressing to memory.

A method is provided for converting a digital audio signal from a non-standard sampling rate to any of a plurality of standard sampling rates. The digital audio signal at the non-standard sampling rate may include any of a mono signal, a left stereo signal, a right stereo signal, and a SAP signal. The digital audio signal may be previously derived from digital channel demodulation and filtering of a composite digital audio signal including channels such as SAP, L−R stereo, and L+R mono. Techniques of up-sampling, low-pass filtering, and down-sampling are employed to perform sampling rate conversion. A single set of low-pass filter coefficients is used for all of the standard sampling rates.

Apparatus is provided for converting a digital audio signal from a non-standard sampling rate to any of a plurality of standard sampling rates. The digital audio signal at the non-standard sampling rate may include any of a mono signal, a left stereo signal, a right stereo signal, and a SAP signal. The digital audio signal may be previously derived from digital channel demodulation and filtering of a composite digital audio signal including channels such as SAP, L−R stereo, and L+R mono. The apparatus comprises a memory storing a single set of low-pass filter coefficients, a low-pass filter using the same single set of low-pass filter coefficients for any of the standard sampling rates, and a linear interpolator allowing non-integer conversion to any of a plurality of standard sampling rates.

Certain embodiments of the present invention afford an approach to achieve efficient, low cost sampling rate conversion to a plurality of standard sampling rates. Certain embodiments of the present invention also use an efficient implementation of a single, fixed set of low-pass filter coefficients to achieve any of the plurality of standard sampling rates.

DETAILED DESCRIPTION OF THE INVENTION

Figure 1:
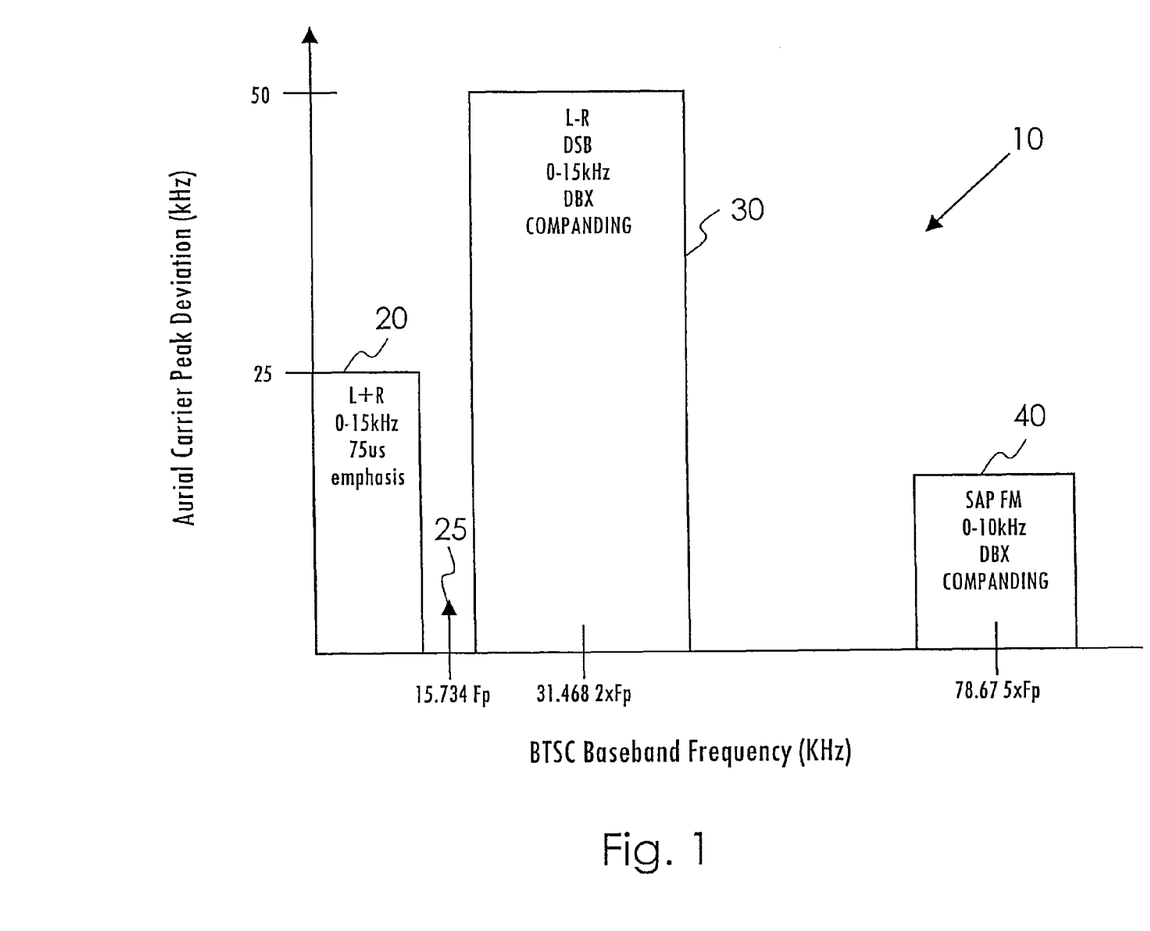
FIG. 1 is an illustration of various possible component channels of a composite audio signal that may be decoded to extract a particular audio channel. A final step of the decoding process is sample rate conversion that uses a single, fixed set of low-pass filter coefficients in accordance with an embodiment of the present invention.

FIG. 1 is an illustration of various possible component channels of a composite audio signal 10 that may be decoded to extract a particular audio channel. A final step of the decoding process is sample rate conversion that uses a single, fixed set of low-pass filter coefficients in accordance with an embodiment of the present invention.

During the 1980's, the FCC adopted the BTSC format as a standard for multi-channel television sound (MTS). Typically, the BTSC format is used with a composite TV signal that includes a video signal as well as the BTSC format for the sound reproduction.

The BTSC format is similar to FM stereo but has the ability to carry two additional audio channels. Left plus right (L+R) channel mono information 20 is transmitted in a way similar to stereo FM in order to ensure compatibility with monaural television receivers. A 15.734 KHz pilot signal 25 is used, instead of the FM stereo 19 KHz pilot signal, which allows the pilot signal 25 to be phase-locked to the horizontal line frequency. A double sideband-suppressed carrier, at twice the frequency of the pilot, transmits the left minus right (L−R) stereo information 30. The stereo information is DBX encoded to aid in noise reduction. An SAP channel 40 is located at 5 times the pilot frequency. The SAP channel 40 may be used for second language or independent source program material. A professional audio channel (not shown) may be added at 6.5 times the pilot frequency 25 in order to accommodate additional voice or data.

Figure 2:
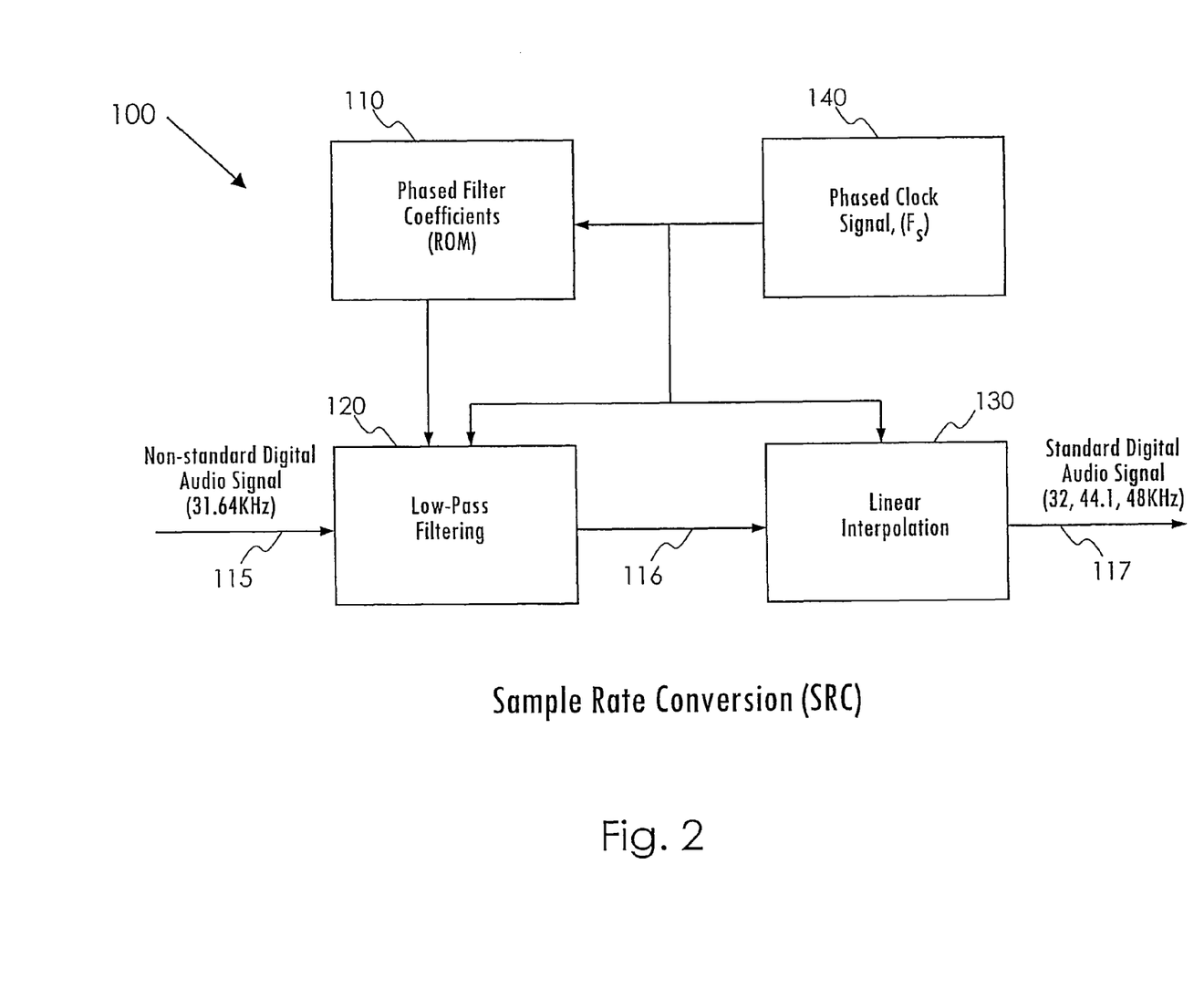
FIG. 2 is a functional block diagram of an apparatus for performing sampling rate conversion from a non-standard sampling rate to any of a plurality of standard audio sampling rates using a single, fixed set of low-pass filter coefficients in accordance with an embodiment of the present invention.

FIG. 2 is a functional block diagram of an apparatus for performing sampling rate conversion from a non-standard sampling rate to any of a plurality of standard audio sampling rates using a single, fixed set of low-pass filter coefficients in accordance with an embodiment of the present invention. The apparatus 100 comprises a ROM memory 110 storing a set of phased filter coefficients, a low-pass filter 120 performing low-pass filtering of a non-standard digital audio signal 115, and a linear interpolator 130 performing linear interpolation between output samples of the low-pass filter 120. A phased clock signal 140 is used to clock the sampling rate conversion apparatus 100 in order to output samples of a standard audio signal 117 at a standard digital audio sampling rate.

Sampling rate conversion (SRC) is performed on the decoded SAP audio signal, the demodulated mono audio signal (L+R), or the stereo left and right audio signals. In one embodiment of the present invention, the sampling rate of the demodulated audio signals is 31.64 KHz and is a non-standard sampling rate. Efficiency of preceding decoding functions is achieved, however, by generating all of the demodulated audio signals at the same sampling rate of 31.64 KHz and then performing sampling rate conversion to any of the standard audio sampling rates.

In accordance with an embodiment of the present invention, sampling rate conversion is a process of translating the non-standard audio signal sampling rate of 31.64 KHz to a sampling rate including one of the standard audio output sampling rates of 32 KHz, 44.1 KHz, or 48 KHz. An embodiment of the present invention accomplishes sampling rate conversion by performing a combination of signal up-sampling, interpolation, and signal down-sampling.

Up-sampling is the first part of sampling rate conversion and is typically performed by inserting zeros between digital samples of the non-standard digital audio signal 115 to generate a signal at a higher effective sampling rate. The value of the up-sampling factor is determined by trading off various factors of complexity, cost, and performance. In an embodiment of the present invention, the non-standard digital audio signal 115 is effectively up-sampled by a factor of 64 and filtered with a low-pass filter having 1152 taps (i.e. using 1152 coefficients).

A problem with up-sampling is that it generates aliasing. Therefore, aliased components appear in the final sampling rate converted signal if the aliased components are not filtered out (or at least greatly reduced). A low-pass filter is used to perform the function of interpolating the up-sampled signal to generate digital sample values that correspond to the up-sampled rate. If a set of low-pass filter coefficients is designed with a cut-off frequency corresponding to approximately $\pi$ divided by the up-sampling factor or lower, the aliased components are filtered out of (or greatly reduced in) the resultant signal before down-sampling is performed. The vast majority of the audio information is below 12 KHz. In an embodiment of the present invention, the cut-off frequency of the low-pass filter is designed to be at 13 KHz. The cut-off frequency of 13 KHz reduces the aliased components and simplifies the filter design.

A feature of one embodiment of the present invention with respect to sampling rate conversion is that any of the resultant audio output signals (SAP out, mono out, left out, right out) may be converted to any one of the three standard audio output sampling rates listed above by using the same set of low-pass filter coefficients 110 in the SRC conversion process performed by apparatus 100.

Figure 3:
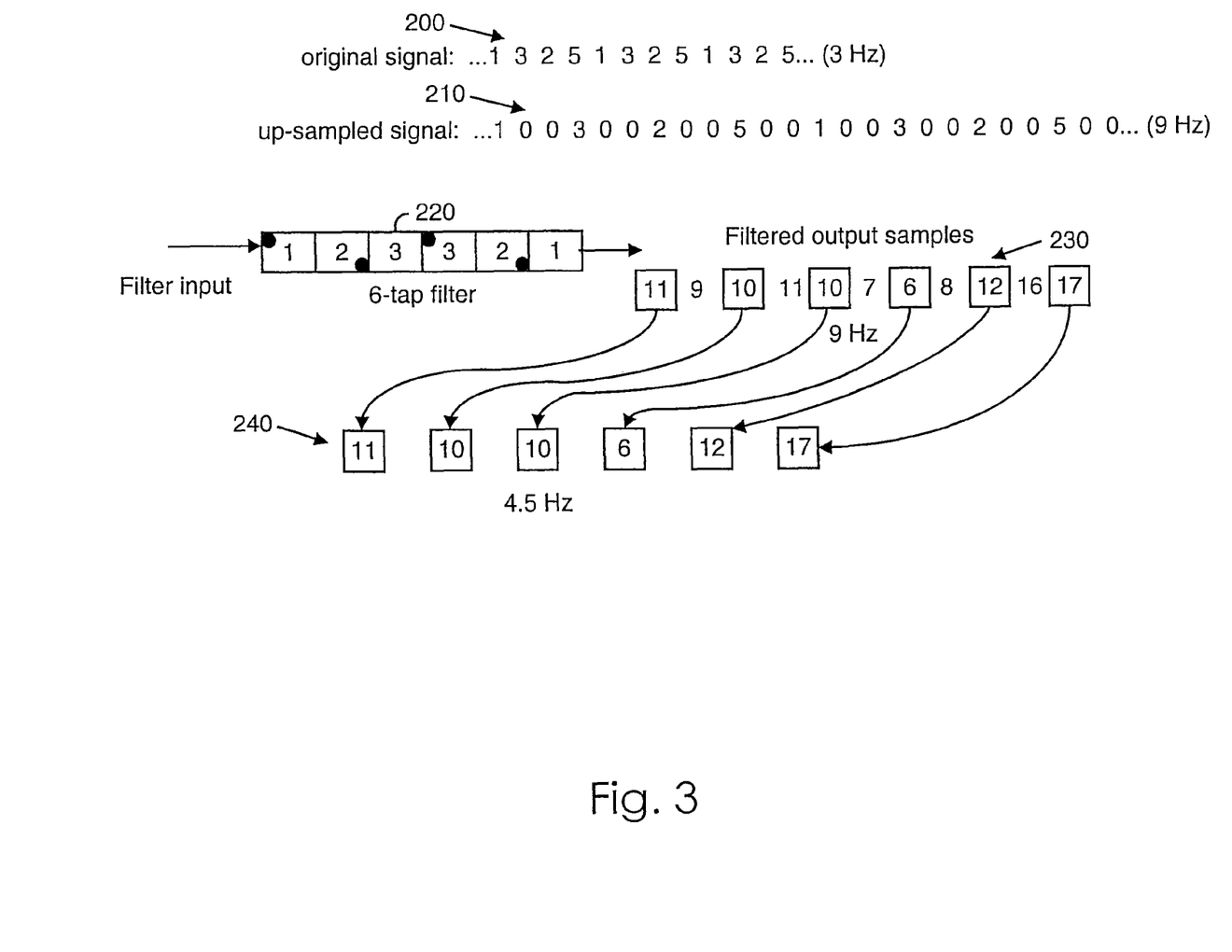
FIG. 3 is an exemplary illustration of low-pass filtering in accordance with an embodiment of the present invention.

To illustrate the up-sampling and filtering process, FIG. 3 shows a simple example of inserting zeros in an original signal 200 at, for example, 3 Hz to generate an up-sampled signal 210 at 9 Hz (i.e. up-sampling factor is three). The up-sampled signal 210 is passed through a simple 6-tap filter 220 having a fixed set of filter coefficients (which are symmetric in the example) and generating a set of output samples 230. The output samples are at the up-sampled rate of 9 Hz. Typically, the coefficient values of the filter are scaled or normalized such that the resultant output values are an interpolated representation of the input values. If a down-sampling factor of, for example, two is then selected, the resultant output sampling rate is 4.5 Hz and the corresponding output samples are those samples 240 shown in the boxes in FIG. 3.

Figure 4:
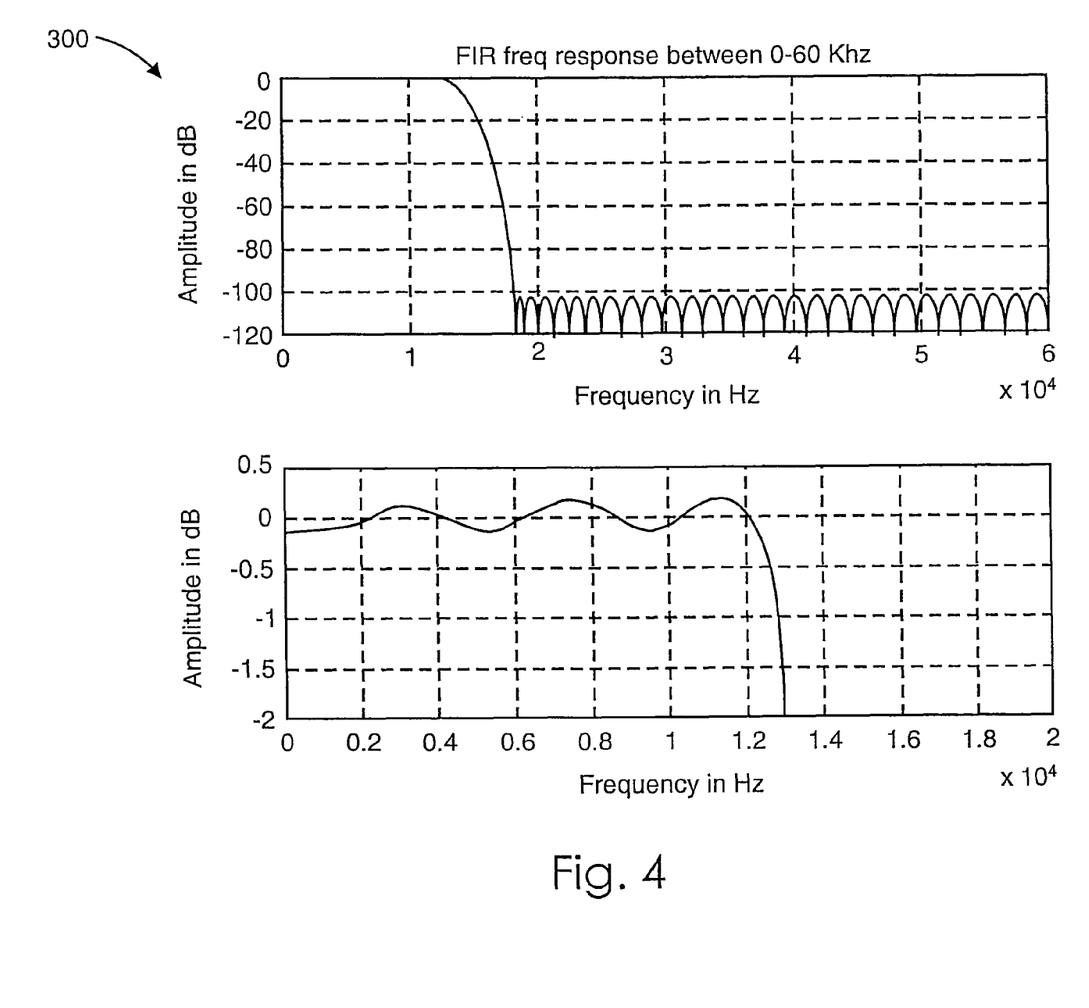
FIG. 4 is an illustration of the frequency response of a low-pass filter that is used in the apparatus of FIG. 2 in accordance with an embodiment of the present invention.

By designing the filter coefficients correctly as described above, the unwanted aliased components are filtered out (or greatly reduced). In an embodiment of the present invention, the low-pass filter uses 1152 taps or coefficients having the frequency response 300 shown in FIG. 4.

If the desired final sampling rate in the example of FIG. 3 is instead 6 Hz, then the filtered signal is down-sampled by a factor of 1.5 (i.e. 9 Hz/1.5=6 Hz). However, down-sampling by a factor of 1.5 (a non-integer value) means sometimes selecting samples between the filtered output samples 230. Since there are no samples to choose from between the filtered output samples, linear interpolation is performed to make up samples where needed to achieve down-sampling by a factor of 1.5 yielding a sampling rate of 6 Hz.

Figure 5:
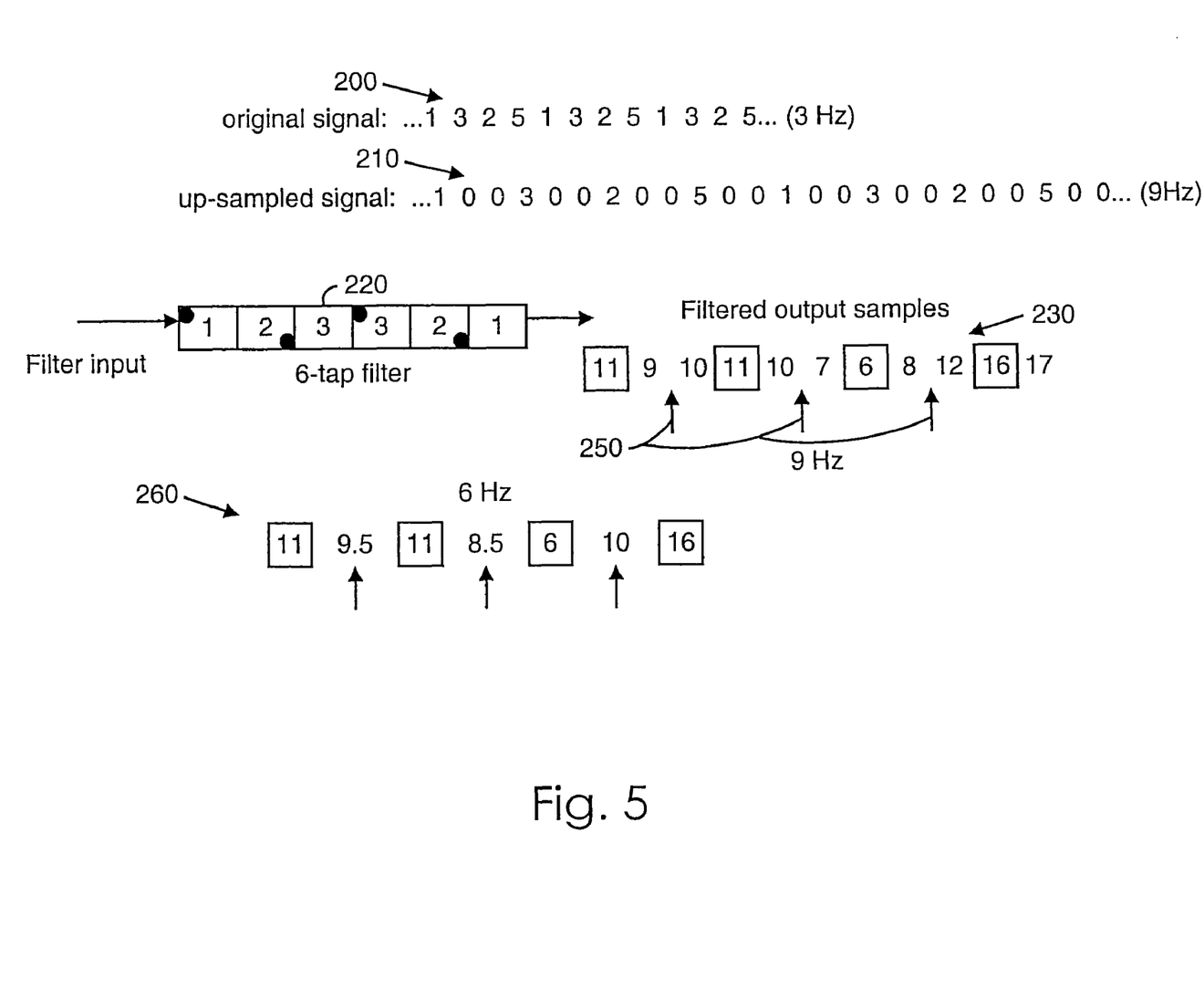
FIG. 5 is an exemplary illustration of low-pass filtering and linear interpolation in accordance with an embodiment of the present invention.

FIG. 5 illustrates the current example of sampling rate converting from 9 Hz to 6 Hz using linear interpolation. The filtered output sequence 230 is the same as before but now samples must be selected between certain output samples because the down-sampling factor is not an integer value in the current example of FIG. 5. The arrows 250, illustrate where interpolation must be performed. The boxes indicate samples that may be used directly. In the current example, the linear interpolator 130 performs a simple averaging of the values on either side of the interpolated points to yield the output sequence 260 at the desired 6 Hz rate. The values of 9.5, 8.5, and 10 are the interpolated values.

In an embodiment of the present invention, sampling rate conversion is being performed on a non-standard digital audio signal 115 of 31.64 KHz to convert to any of the standard audio sampling rates of 32 KHz, 44.1 KHz, and 48 KHz. Since the effective up-sampling factor is always 64, the down-sampling factor will never be an integer value and, therefore, linear interpolation is used to generate the standard digital audio signal 117. The down-sampling factor corresponding to the standard audio sampling rates are then

| standard sampling rate | down-sampling factor |
| --- | --- |
| 32 KHz | 63.28 |
| 44.1 KHz | 45.917 |
| 48 KHz | 42.186 |

Since, in an embodiment of the present invention, the up-sampling factor is always 64 and the sampling rate of the standard digital audio signal 117 is always greater than the sampling rate of the non-standard digital audio signal 115, a single set of low-pass filter coefficients may be used. There is no need for a dedicated up-sampling rate or filter for each standard sampling rate.

To simplify the implementation of an embodiment of the present invention, instead of using a single 1152-tap filter operating on an up-sampled signal, the 1152 tap coefficients are re-arranged into 64 phases of 18 coefficients each. The non-standard digital audio signal 115 is then operated on by the low-pass filter 120 with the various phases of coefficients as needed. FIG. 2 illustrates the phased filtering implementation.

Figure 6:
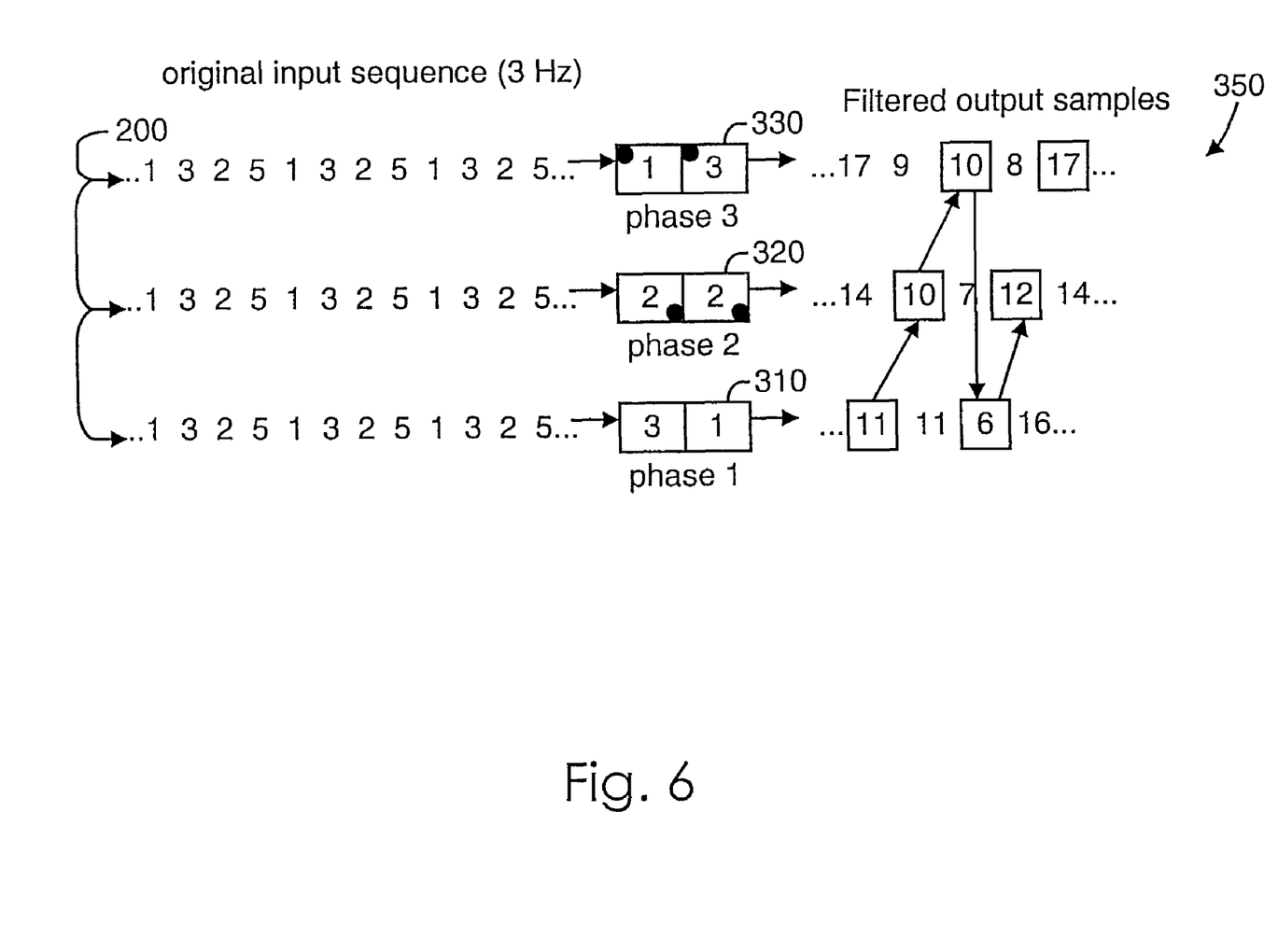
FIG. 6 is an exemplary illustration of phased filtering in accordance with an embodiment of the present invention.

FIG. 6 illustrates a simple example of phased filtering to simplify the sampling rate conversion implementation. The original filter 220 is now divided up into three phases as shown in FIG. 6. There are three phases because the up-sampling factor is three. Certain taps of the filter 200 are shown having black dots in certain corners to make it clear which taps are used to create the phased filters in FIG. 6. Every third tap is selected from the original filter 220 to generate the phased filters. The original input signal is operated on by each of the three phases yielding the filtered output samples 350 as shown in FIG. 6. If the desired output sampling rate is again 4.5 Hz as before, the down-sampling factor is again two. To generate the desired 4.5 Hz output signal, the boxed samples of the output samples 350 of the various phases shown in FIG. 6 are selected.

It may be seen that the selected output samples in FIG. 6 are the same as those output samples selected in FIG. 3 for the 4.5 Hz sampling rate. Each successive output sample is generated by a different filter phase. The first sample is from phase 1 (310), the second sample is from phase 2 (320), the third sample is from phase 3 (330), and the fourth sample is again from phase 1 (310). This rotating cycle of generating the output samples at a rate of 4.5 Hz from the different phases means that only one filter phase (having only two-taps) needs to be calculated for a given output sample. Also, the non-standard digital audio signal 115 is effectively up-sampled by duplication instead of inserting zeros. The filtered signal is effectively down-sampled by applying the appropriate phased filter for the appropriate output sample. By implementing sampling rate conversion according to the configuration of FIG. 2 as illustrated by the simple example of FIG. 6, great efficiencies in hardware and computation are achieved. It should be noted that, for the example of converting to the output sampling rate of 6 Hz, two phased filtered outputs are generated for each 6 Hz output sample, and linear interpolation is performed between the two filtered samples. Still, this is a great improvement in having to up-sample by inserting zeros and operating on all 6-taps for every output sample generated.

In an embodiment of the present invention, the 1152 coefficients are divided into 64 phases of 18 coefficients each. A given 18-tap phased filter is generated by selecting every $64^{th}$ coefficient from the original 1152 tap filter. To generate an output sample of the standard digital audio signal, only two 18-tap phases of the 64 are used along with linear interpolation. The 64 phases are rotated through to generate successive output samples at any of the standard sampling rates. The next pair of phases to be used to generate the next output sample depends on the effective down-sampling rate currently selected and the current phase of the standard digital audio signal. Periodically during the generation of the standard digital audio signal 117, four phases are selected and 2 output sample points are generated at the same time in order to maintain the desired standard sampling rate.

For an embodiment of the present invention described, the interpolated points do not always fall exactly in between two filtered points. For any given pair of filtered points to be interpolated, there is a corresponding accumulated interpolation ratio that is generated by the linear interpolator 130. As generation of successive output samples proceeds, the linear interpolator increments the accumulated interpolation ratio, for the current phase of the standard digital audio signal being generated, and applies the current interpolation ratio in the interpolation process. For example, for the standard sampling rate of 44.1 KHz, the interpolation ratio increment is (4410−3164)/3164=1246/3164.

Therefore, for a first output sample of the standard digital audio signal 117, the linear interpolator will interpolate between two filtered output samples, weighting the one filtered output sample by the current accumulated interpolation ratio of 1246/3164 and the other filtered output sample by 1−(1246/3164), which is one minus the current accumulated interpolation ratio. For the very next output sample, the accumulated interpolation ratio is incremented by 1246/3164 to 2492/3164 and the linear interpolator generates the next output sample based on 2492/3164 and 1−(2492/3164). As a result, interpolation is always done at the appropriate distance between the appropriate two filtered output samples. For the other standard output sampling rates of 32 KHz and 48 KHz, the interpolation ratio increments will be (3200−3164)/3164=36/3164 and (4800−3164)/3164=1636/3164, respectively.

The various elements illustrated in FIG. 2 may be combined or separated according to various embodiments of the present invention within the ASIC chip or may be separated and implemented over more than one chip.

In summary, certain embodiments of the present invention use a single set of low-pass filter coefficients to perform sampling rate conversion from a non-standard sampling rate to any of a plurality of standard sampling rates. An efficient implementation employing phased filtering techniques is used to perform sampling rate conversion.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of converting a first digital audio signal at a first sampling rate to a second digital audio signal at a second sampling rate that is higher than the first sampling rate, the method comprising:
   storing a set of filter coefficients;
   selecting a plurality of first digital audio samples from the first digital audio signal;
   low-pass filtering the plurality of first digital audio samples according to a subset of the set of filter coefficients; and
   generating an output sample of the second digital audio signal based on an interpolation ratio corresponding to the first sampling rate and the second sampling rate.

2. The method of claim 1, wherein the method comprises performing linear interpolation between filter inputs to generate interpolated output samples of the second digital audio signal.

3. The method of claim 1, wherein the interpolation ratio is dynamically generated to correspond to any of a plurality of audio sampling rates.

4. The method of claim 1, wherein the interpolation ratio is a non-integer.

5. The method of claim 1, wherein a cut-off frequency corresponding to a frequency response of the set of filter coefficients is no greater than a frequency corresponding to $\pi$ divided by an up-sampling factor.

6. The method of claim 2, wherein performing linear interpolation is done in response to the interpolation ratio that is based on a current down-sampling factor and a current phase of the second digital audio signal.

7. The method of claim 1, wherein the method comprises:
   storing the set of filter coefficients as a plurality of phased subsets of filter coefficients;
   applying samples of the first digital audio signal to at least two phased subsets of the plurality of phased subsets of filter coefficients to generate at least two filtered samples of a filtered audio signal; and
   linear interpolating between the at least two filtered samples to generate the output sample of the second digital audio signal.

8. The method of claim 7, wherein a total number of the plurality of phased subsets is equal to an up-sampling factor.

9. The method of claim 7, wherein the at least two phased subsets are selected from the plurality of phased subsets to generate the at least two filtered samples based on a current down-sampling factor of a plurality of down-sampling factors and a current phase of the output sample.

10. The method of claim 7, wherein the linear interpolation is done in response to an accumulated linear interpolation ratio that is based on a current down-sampling factor of a plurality of down-sampling factors and a current phase of the output sample.

11. Apparatus for converting a first digital audio signal at a first sampling rate to a second digital audio signal at any of a plurality of sampling rates that are higher than the first sampling rate, the apparatus comprising:
   a memory operable to store a set of digital filter coefficients; and
   a processor operable to:
      generate an interpolation ratio,
      access a coefficient subset from the set of digital filter coefficients according to the interpolation ratio and a current phase,
      select a plurality of first digital audio samples from the first digital audio signal, and
      filter the plurality of first digital audio samples according to the coefficient subset to generate an output sample of the second digital audio signal.

12. The apparatus of claim 11, wherein the set of digital filter coefficients is arranged in the memory as a plurality of phased subsets of the set of digital filter coefficients.

13. The apparatus of claim 11, wherein a total number of the plurality of phased subsets is equal to an effective up-sampling factor.

14. The apparatus of claim 11, wherein the effective up-sampling factor is an integer.

15. The apparatus of claim 11, wherein the interpolation ratio is based on a current effective down-sampling factor.

16. The apparatus of claim 15, wherein the effective down-sampling factor is a non-integer.

17. The apparatus of claim 11, wherein the memory is ROM.

18. The apparatus of claim 12, wherein the output sample of the second digital audio signal is generated from at least two first digital audio samples from the first digital audio signal.

19. The apparatus of claim 18, wherein the output sample is generated by applying at least two phased subsets of the plurality of phased subsets to the at least two first digital audio samples.

20. The apparatus of claim 19, wherein the at least two phased subsets are selected from the plurality of phased subsets to generate the output sample based on a current down-sampling factor and a current phase.

* * * * *